ns Patented July 17, 1962

3,044,942
PROCESS FOR PREPARING POLY-β-HYDROXY-BUTYRIC ACID
James Noel Baptist, Laurel, Md., assignor to W. R. Grace & Co., New York, N.Y., a corporation of Connecticut
No Drawing. Filed Sept. 27, 1960, Ser. No. 58,614
21 Claims. (Cl. 195—47)

This invention relates to the synthesis of poly-β-hydroxybutyric acid, a polymer consisting of repeating units of the formula [—CH(CH$_3$)CH$_2$C(O)O—]$_n$. In one particular aspect it is a method for obtaining greater yields of poly-β-hydroxybutyric acid without significantly degrading the polymer. In another particular aspect it is a method for obtaining a polymer with valuable properties as a plastic.

In summary, the invention in its broadest aspect is directed to extracting poly-β-hydroxybutyric acid from bacteria containing the same, by means of a solvent containing a hydrolyzing agent.

In my copending application, Serial No. 58,154 filed Sept. 26, 1960, of which this application is a continuation-in-part, there is described a method for isolating poly-β-hydroxybutyric acid by extraction with pyridine. I have now found that a mixture of methylene chloride and ethanol will not only extract about as much polyester as pyridine, but it will also give a product with considerably higher viscosity.

The poly-β-hydroxybutyric acid produced by this novel method is a translucent, plastic-like material which can be utilized in several ways. It is easily cast into a film or molded into articles by conventional methods. It is also useful for surface coatings and as a fiber.

It is especially useful in the field of medicine. Medical sutures made of poly-β-hydroxybutyric acid need not be removed since they eventually decompose to naturally occurring substances without harm to the patient. Films of poly-β-hydroxybutyric acid can be used to support injured arteries and blood vessels until the tissues heal.

Poly-β-hydroxybutyric acid can be synthesized by various bacteria under suitable conditions. The choice of bacteria depends not only on one capable of forming this polyester, but also on one which can effect the desired biochemical change within a relatively short time and can produce the highest yield with a minimum of attention.

The families where this polyester is known to be a major constituent include Athiorhodaceae, Pseudomonadaceae, Spirillaceae, Rhizobiaceae, Bacillaceae and Azotobacteriaceae. *Rhodospirillum rubrum* of the Athiorhodaceae family and *Bacillus megaterium* of the Bacillaceae family are notable examples. Cultures of bacteria used in established processes are usually available from scientific culture collections such as the A.T.C.C. (American Type Culture Collection, Georgetown University, School of Medicine, Washington, D.C.), the collections of various universities and the U.S. Department of Agriculture.

The individual bacteria cells are physiologically independent. A thin membrane determines the outside boundary of the cell and constitutes the cell wall. Within the cell is a colloidal solution known as cytoplasm. Some of the granules suspended in the cytoplasm have been found to be composed largely of poly-β-hydroxybutyric acid. Under appropriate conditions unusually large amounts of this polyester can be built up in the cells.

There are two processes presented in the literature for isolating poly-β-hydroxybutyric acid from bacteria. In one process the polyester is extracted from the dried bacterial cells with chloroform. Although this method gives a polymer with useful properties as a plastic, the yield is much too low for this process to be of any value. In order to increase product yields, a second method was devised whereby the dried bacterial cells are first digested in sodium hypochlorite and the resulting insoluble residue, crude poly-β-hydroxybutyric acid, is extracted with chloroform. The product obtained by this second method is so degraded that it is useless as a plastic.

It is, therefore, an object of this invention to provide an improved process for producing greater product yields of poly-β-hydroxybutyric acid without significantly degrading the polymer than methods heretofore employed.

It is a further object of this invention to produce a polymer with valuable properties as a plastic.

It has been found that yields of poly-β-hydroxybutyric acid are greatly increased by extracting the polyester with a solution of a solvent and a mild hydrolyzing agent.

It has also been found that the bacteria cells are sufficiently broken up by dispersing them in acetone.

To carry out this improved process, large quantities of appropriate bacteria are grown in a suitable nutrient medium. The bacteria are collected by known means, e.g., centrifugation, and the mass of wet cells is dispersed in acetone. A cells:acetone weight ratio of 1:1 to 10 is suitable.

In addition to breaking up the cell walls, the acetone removes water and dissolves lipids and other materials which would otherwise contaminate the product. The use of acetone at this stage makes the polyester readily extractable.

The acetone is removed and the bacterial residue is easily dried to a powder. The powder is treated with a poly-β-hydroxybutyric solvent containing a hydrolyzing agent. Methylene chloride as a solvent with ethanol as a hydrolyzing agent is preferred. Suitably, a methylene chloride:ethanol weight ratio of about 5:1 and a bacteria residue:methylene chloride/ethanol solution weight ratio of about 1:10 to 100 is used. The bacterial residue powder can be treated with the methylene chloride/ethanol solution at reflux temperature or below.

The polyester solution is filtered and the polyester can be recovered from the filtrate by various methods. The polyester can be recovered by evaporating the solution. Suitable precipitants such as petroleum ether and petroleum hydrocarbons in general can be used. A means that is particularly suitable for precipitating the polyester, and which is a preferred embodiment of this invention, is to add ether to the methylene chloride/ethanol solution. An ether:methylene chloride/ethanol ratio of about 3:1 is suitable.

Other methods of recovering the polyester include adding water, alcohol and nonpolar solvents such as benzene to the solvent/hydrolyzing agent solution. Generally, liquids miscible in the polyester solvent will precipitate the polyester.

This invention can be varied without departing from its scope. For example, means other than acetone can be used to dry and to break up the bacterial cell mass sufficiently for extraction of the polyester. This can be done by placing the bacterial cell mass under a vacuum or in an oven at about 105° C. in the absence of oxygen. Mixing the cell mass with an antioxidant and placing it in an oven at about 105° C. is another method.

Obviously, other solvents such as chloroform, 1,4-dioxane or pyridine can be used as the polymer solvent in place of methylene chloride.

Other hydrolyzing agents which can be used include other alcohols, carboxylic acids and amines. Any of these compounds when present in small amounts will break a few of the polyester bonds and thus reduce the average molecular weight of the polyester enough to make it dissolve.

The following examples will serve to illustrate the invention:

EXAMPLE I

A nutrient medium having the following composition was prepared:

| | | |
|---|---|---|
| Glucose | g | 240.0 |
| Mineral solutions [1] | ml | 600.0 |
| Yeast extract | g | 9.0 |
| Water | ml | 12000.0 |

[1] Mineral solution: 10.0 g. $(NH_4)_2SO_4$, 10.0 g. $KH_2PO_4$, 18.9 g. $Na_2HPO_4 \cdot 7H_2O$, 2.0 g. $MgSO_4$, 0.2 g. $CaCl_2$, 0.06 g. $FeCl_3$, 1000.0 ml. $H_2O$.

The nutrient medium was autoclaved and allowed to cool. A 500 ml. inoculum of *Bacillus megaterium* (A.T.C.C. #8245) from a 24-hour old culture was added to the nutrient medium. The medium was continuously aerated at room temperature for about sixty hours with filtered air at the rate of about 200 to 500 cc. per minute. Aeration was vigorous enough to mix the nutrient medium continuously. At the end of the incubation period, the cells were harvested by centrifugation and mixed with 200 ml. of acetone. The acetone was filtered off and the bacterial residue was added to another 200 ml. of acetone and allowed to stand for about 15 hours. The acetone was then removed and the bacterial residue was air dried until the odor of acetone disappeared. The dried residue weighed 11.4 g.

EXAMPLE II

One gram of dry *B. megaterium* cells produced in the manner described in Example I was added directly to a solution consisting of 50 ml. of methylene chloride and 10 ml. of ethanol. The solution was refluxed for 10 minutes and filtered. 200 ml. of ether was added to the clear filtrate to precipitate the polyester. After three hours the solution was chilled, filtered and the polyester precipitate was dried in a vacuum dessicator. The dried product weighed 0.173 g.

EXAMPLE III

Samples of dry *B. megaterium* produced in the manner described in Example I were placed in solvents as listed below. Each sample was filtered and 200 ml. ether was added to each filtrate to precipitate the poly-β-hydroxybutyric acid. After about fifteen hours each sample was filtered. Samples A and B were air dried while samples C, D and E were washed with water several times before being air dried.

| Sample | Sample Weight, g. | Solvent | Temp., C. | Time, days | Yield, mg. |
|---|---|---|---|---|---|
| A | 1 | 50 ml. $CH_2Cl_2$ | 25 | 2½ | 2.7 |
| B | 1 | 40 ml. $CH_2Cl_2$+10 ml. pyridine. | 25 | 2½ | 1-5 |
| C | 1 | 50 ml. $CH_2Cl_2$+4 ml. triethanolamine. | 25 | 2½ | 78 |
| D | 1 | 50 ml. $CH_2Cl_2$+10 ml. ethanol. | 30 | 2 | 86.4 |
| E | 1 | 50 ml. $CH_2Cl_2$+5 ml. triethylamine. | 30 | 2 | 14 |

This data illustrates the effect of a hydrolyzing agent. Methylene chloride, alone, extracted only a negligible amount of polyester as compared to that extracted by the methylene chloride/ethanol solution. The methylene chloride and triethanolamine mixture extracted an unusually large amount of polyester even though a large amount of quaternary ammonium salt was also produced under these conditions.

EXAMPLE IV

A nutrient medium having the following composition was prepared:

| | | |
|---|---|---|
| Phosphate buffer [1] | ml | 320.0 |
| Mixed mineral solution [2] | ml | 320.0 |
| Sodium acetate | g | 22.0 |
| Yeast extract | g | 16.0 |
| Water | l | 15.4 |

[1] Phosphate buffer: 46.0 g. $KH_2PO_4$, 86.4 g. $Na_2HPO_4 \cdot 7H_2O$, 2000 ml. $H_2O$.
[2] Mixed mineral solution: 10 g. nitrilotriacetic acid dissolved in $H_2O$ and neutralized with a solution of 7.3 g. KOH (pH about 8). Add 14.45 g. $MgSO_4$, 2.5 g. $CaCl_2$, 9.2 mg. $(NH_4)_6Mo_7O_{24} \cdot 4H_2O$, 99 mg. $FeSO_4 \cdot 7H_2O$, 5.0 ml. standard trace metal solution. [a] Add $H_2O$ to give 1 l. and adjust to pH 6.5–7.0.
[a] Standard trace metal solution: 0.106 g. $CoCO_3$, 1.14 g. $MnCO_3$, 5.21 g. $ZnCl_2$, 5.0 g. $FeSO_4 \cdot 7H_2O$, 0.39 g. $CuSO_4 \cdot 5H_2O$, 0.117 g. $H_3BO_3$, 2.50 g. versene acid, several drops $H_2SO_4$, 1000.0 ml. $H_2O$.

The nutrient medium was autoclaved and allowed to cool. An 80 ml. inoculum of *R. rubrum* (C. B. van Niel strain 1.1.1.) from a seven day old culture was added to the nutrient medium. Two 150-watt floodlights were focused on the culture and the temperature was maintained at about 30° C. The medium was continuously aerated with a stream composed of 5% $N_2$ and 95% $CO_2$.

After six days the stream of $N_2$ and $CO_2$ was stopped and the culture was aerated with $H_2$ for six hours. The pH rose from 7 to 9. The $H_2$ was stopped and aeration with $N_2$ and $CO_2$ was resumed for 18 hours and then stopped. Aeration with $H_2$ was resumed and after 6 hours the $H_2$ was stopped. The cells were harvested by centrifugation and weighed 37.6 g.

EXAMPLE V

The effectiveness of various solvents in extracting poly-β-hydroxybutyric acid is illustrated in the table below. The degree of polymerization of the final product is indicated by the intrinsic viscosity. *R. rubrum* cells obtained in Example IV were used.

| Sample No. | *R. rubrum* cells | Solvent | Time | Temp. | Yield | Intrinsic Viscosity | Yield/10g. Wet Cells, g. |
|---|---|---|---|---|---|---|---|
| 1 | Dried (1.7 g.[1]) | 50 ml. Pyridine | 15 min | Reflux | 0.282 g | 1.30 | 0.564 |
| 2 | do | 50 ml. $CHCl_3$ | 30 min | do | 0.155 g | 3.05 | 0.310 |
| 3 | do | 50 ml. $CH_2Cl_2$+10 ml. ethanol. | 4½ days | 30° C | 0.230 g | 2.20 | 0.461 |
| 4 | Wet (7.50 g.) | 50 ml. $CH_2Cl_2$+10 ml. ethanol. | 5½ days | 30° C | 0.115 g | 1.90 | 0.152 |
| 5 | do | 50 ml. $CH_2Cl_2$ | do | 30° C | 7.9 mg | | 0.0105 |
| 6 | Wet (5.6 g.) | 50 ml. $CHCl_3$ | do | 30° C | 13.3 mg | | 0.024 |

[1] From 5.0 g. of wet cells.

EXAMPLE VI 3 g. of wet *R. rubrum* cells were dispersed in acetone and allowed to stand at room temperature for three hours. The acetone was filtered off and the bacterial mass was air dried. The dried bacterial mass was dissolved in a solution of 100 ml. of methylene chloride and 20 ml. of ethanol. The cells were filtered off and the clear filtrate was placed in a flat dish to dry slowly in the air. After all the solution had evaporated, a thin translucent film remained. The film was easily peeled from the dish.

To determine the type of product obtained when the bacterial mass is initially digested in sodium hypochlorite solution, 3 g. of wet *R. rubrum* cells were dispersed in sodium hypochlorite solution and allowed to stand at room temperature for three hours. The solution was filtered off and the bacterial mass was air dried. The same procedure was then followed as described above. After all the solution had evaporated, a greyish-white material remained which crumbled easily.

EXAMPLE VII 5 g. of *R. rubrum* cells produced in the manner described in Example IV, were mixed with 4 mg. of 2,6-ditertiary-butyl-4-methyl-phenol and dried in an oven at 105° C. The dried sample, weighing 1.7 g., was dispersed in a solution of 50 ml. of methylene chloride and 10 ml. of ethanol and allowed to stand at 30° C. After four days the solution was filtered and 200 ml. of ether was added to the clear filtrate to precipitate the polyester. After three hours the solution was chilled, filtered and the polyester precipitate was dried in a vacuum dessicator. The dried product weighed 0.21 g.

EXAMPLE VIII

The procedure of Example VII was followed except that the bacterial cell mass was dried in an oven at 105° C. for six hours in the absence of oxygen before dispersing in methylene chloride/ethanol solution.

EXAMPLE IX

The procedure of Example VII was followed except that the bacterial cell mass was dried in a vacuum (650 mm. Hg) for 16 hours before dispersing in methylene chloride/ethanol solution.

I claim:

1. In the process of preparing poly-β-hydroxybutyric acid by the growth of bacteria in a culture medium whereby the bacteria acquire deposits of said polyester within their cell walls followed by recovery of the polyester-bearing bacteria and the solvent extraction of the polyester from the bacteria, the improvement comprising the steps of dispersing the polyester-bearing bacteria in acetone to break up the bacteria cell walls and to remove lipids and water therefrom, separating the thus treated bacterial residue and dispersing it in a methylene chloride/ethanol solution to cause mild partial hydrolysis of poly-β-hydroxybutyric acid and to extract it from the bacterial residue, separating the insoluble bacterial residue from the methylene chloride/ethanol solution, and recovering the poly-β-hydroxybutyric acid from the methylene chloride/ethanol solution.

2. The method according to claim 1 in which the poly-β-hydroxybutyric acid is recovered from the methylene chloride/ethanol solution by adding liquids miscible with methylene chloride thereto to precipitate the polyester.

3. The method according to claim 1 in which the methylene chloride:ethanol weight ratio is substantially 1:1 to 20:1.

4. The method according to claim 1 in which the poly-β-hydroxybutyric acid is recovered from the methylene chloride/ethanol solution by adding ether thereto to precipitate the polyester.

5. The method according to claim 1 in which the bacteria is selected from the group of families consisting of Anthiorhodaceae, Psuedomonadaceae, Spirillaceae, Rhizobiaceae, Bacillaceae and Azotobacteraceae.

6. The method according to claim 5 in which the bacterium is *Bacillus megaterium*.

7. The method according to claim 5 in which the bacterium is *Rhodospirillum rubrum*.

8. The method according to claim 1 in which the weight ratio of bacteria:acetone is substantially 1:1 to 10.

9. The method according to claim 8 in which the weight ratio of bacterial residue:methylene chloride/ethanol is substantially 1:10 to 100.

10. The method according to claim 9 in which the extraction with methylene chloride/ethanol solution is carried out under reflux for about 5–30 minutes.

11. The method according to claim 10 in which ether is added to the refluxed methylene chloride/ethanol solution in an ether:methylene chloride/ethanol weight ratio between about 1:1 and 10:1, whereby poly-β-hydroxybutyric acid is precipitated, followed by recovering and drying the said precipitate.

12. The process of recovering poly-β-hydroxybutyric acid from a bacterial cell mass containing this polyester which comprises adding the bacterial cell mass to methylene chloride/ethanol solution to extract the poly-β-hydroxybutyric acid, separating the methylene chloride/ethanol/polyester solution from the cell residue, and recovering the polyester product from solution.

13. The process of preparing poly-β-hydroxybutyric acid which comprises growing appropriate bacteria in a culture medium under conditions conductive to the formation of poly-β-hydroxybutyric acid, adding the bacterial cell mass to methylene chloride/ethanol solution to extract the poly-β-hydroxybutyric acid, separating the methylene chloride/ethanol/polyester from the cell residue, and recovering the polyester product from solution.

14. The process of recovering poly-β-hydroxybutyric acid from a bacterial cell mass containing this polyester which comprises drying the bacterial cell mass, dispersing it in methylene chloride/ethanol solution to extract the poly-β-hydroxybutyric acid, separating the methylene chloride/ethanol/polyester solution from the cell residue, and recovering the polyester product from solution.

15. The method according to claim 14 in which the bacterial cell mass is dried by extracting it with acetone.

16. The method according to claim 14 in which the bacterial cell mass is dried in an oven at 105° C. in the absence of oxygen.

17. The method according to claim 14 in which the bacterial cell mass is mixed with an antioxidant and dried in an oven at about 105° C.

18. The method according to claim 14 in which the bacterial cell mass is dried under a vacuum.

19. The process of preparing poly-β-hydroxybutyric acid from *Rhodospirillum rubrum* by inoculating *Rhodospirillum rubrum* into a culture medium comprised of 320 ml. phosphate buffer composed of 46.0 g. $KH_2PO_4$, 86.4 g. $Na_2HPO_4 \cdot 7H_2O$, 2000 ml. $H_2O$; 320 ml. mixed mineral solution composed of 10 g. nitrilotriacetic acid dissolved in $H_2O$ and neutralized with a solution of 7.3 g. KOH and adding 14.45 g. $MgSO_4$, 2.5 g. $CaC_2$, 9.2 mg. $(NH_4)_6Mo_7O_{24} \cdot 4H_2O$, 99 mg. $FeSO_4 \cdot 7H_2O$, 5.0 ml. standard trace metal solution, enough $H_2O$ to make 1 l. adjusting pH 6.5 to 7.0, the standard trace metal solution being composed 0.106 g. $CoCO_3$, 1.14 g. $MnCO_3$, 5.21 g. $ZnCl_2$, 5.0 g. $FeSO_4 \cdot 7H_2O$, 0.39 g. $CuSO_4 \cdot 5H_2O$, 0.117 g. $H_3BO_3$, 2.50 g. versene acid, several drops $H_2SO_4$, 1000.0 ml. $H_2O$; aerating the inoculated culture medium with a nitrogen:carbon dioxide mixture under illumination; stopping the nitrogen:carbon dioxide flow and aerating with hydrogen under illumination; harvesting the bacterial cell mass; dispersing the bacterial cell mass in acetone to break up the bacterial cell walls and to remove lipids and water therefrom; separating the thus treated bacterial cell mass and dispersing it in methylene chloride/ethanol solution to extract poly-β-hydroxybutyric acid; separating the polyester solution from the cell residue; adding ether to the polyester solution to precipitate the polyester and recovering the polyester product.

20. The process of preparing poly-β-hydroxybutyric acid from *Bacillus megaterium* by inoculating *Bacillus megaterium* into a culture medium comprised of 240 g. glucose, 9 g. yeast extract, 600 ml. mineral solution and 12,000 ml. water, the mineral solution being composed of 10 g. $(NH_4)_2SO_4$, 10 g. $KH_2PO_4$, 18.9 g. $Na_2HPO_4 \cdot 7H_2O$, 2 g. $MgSO_4$, 0.2 g. $CaCl_2$, 0.06 g. $FeCl_3$ and 1000 ml. $H_2O$; continuously aerating the inoculated culture medium during the incubation period with filtered air at about room temperature during the incubation period; harvesting the bacterial cell mass; dispersing the bacterial cell mass in acetone to break up the bacterial cell walls and to remove lipids and water therefrom; separating the thus treated bacterial mass and dispersing it in methylene chloride/ethanol solution to extract poly-β-hydroxybutyric acid; separating the polyester solution from the cell residue; adding ether to the polyester solution to precipitate the polyester and recovering the polyester product.

21. The process of recovering poly-β-hydroxybutyric acid from a bacterial cell mass containing this polyester by drying the bacterial cell mass under nonoxidative conditions, dispersing it in a poly-β-hydroxybutyric acid solvent/hydrolyzing agent solution to cause mild partial hydrolysis of the polyester and to dissolve the polyester, separating the solution of polyester from the cell residue, and recovering the polyester product from the solvent/hydrolyzing agent solution.

No references cited.

UNITED STATES PATENT OFFICE
CERTIFICATE OF CORRECTION

Patent No. 3,044,942                                      July 17, 1962

James Noel Baptist

It is hereby certified that error appears in the above numbered patent requiring correction and that the said Letters Patent should read as corrected below.

Column 6, line 45, for "$CaC_2$" read -- $CaCl_2$ --.

Signed and sealed this 8th day of January 1963.

(SEAL)
Attest:

ERNEST W. SWIDER                                    DAVID L. LADD
Attesting Officer                                         Commissioner of Patents